(12) United States Patent
Lush

(10) Patent No.: US 8,056,507 B2  
(45) Date of Patent: Nov. 15, 2011

(54) SQUIRREL-PROOF SUNFLOWER SEED BIRD FEEDER

(76) Inventor: Raymon W. Lush, Bloomfield, NE (US)

(*) Notice: Subject to any disclaimer, the term of this patent is extended or adjusted under 35 U.S.C. 154(b) by 160 days.

(21) Appl. No.: 12/454,335

(22) Filed: May 15, 2009

(65) Prior Publication Data
US 2010/0288201 A1  Nov. 18, 2010

(51) Int. Cl.  
*A01K 39/01* (2006.01)
(52) U.S. Cl. .................... 119/57.8; 119/57.9
(58) Field of Classification Search ............ 119/52.3, 119/57.8, 57.9; *A01K 39/01*
See application file for complete search history.

(56) References Cited

U.S. PATENT DOCUMENTS

| 4,646,686 A | 3/1987 | Furlani | |
|---|---|---|---|
| 5,111,772 A | 5/1992 | Lipton | |
| 5,163,382 A * | 11/1992 | Morrison | 119/57.9 |
| 5,195,459 A * | 3/1993 | Ancketill | 119/57.9 |
| 5,720,238 A | 2/1998 | Drakos | |
| 6,253,707 B1 | 7/2001 | Cote | |
| 6,543,384 B2 | 4/2003 | Cote | |
| D486,272 S | 2/2004 | Donegan | |
| D498,335 S | 11/2004 | Donegan | |
| 7,191,731 B2 * | 3/2007 | Cote | 119/57.9 |
| 7,198,004 B1 | 4/2007 | Lush | |
| 7,302,911 B1 * | 12/2007 | Lush | 119/57.8 |
| 7,540,260 B2 | 6/2009 | Rich et al. | |
| 2004/0123808 A1 * | 7/2004 | Dunn | 119/57.9 |

* cited by examiner

*Primary Examiner* — Son T Nguyen  
*Assistant Examiner* — Kathleen Iwasaki  
(74) *Attorney, Agent, or Firm* — Dennis L. Thomte; Thomte Patent Law Office LLC

(57) ABSTRACT

A squirrel-proof sunflower seed bird feeder is provided which denies feeding access to squirrels by way of a unique connection system between an inner housing member and an outer housing member of the bird feeder.

4 Claims, 2 Drawing Sheets

SQUIRREL-PROOF SUNFLOWER SEED BIRD FEEDER

BACKGROUND OF THE INVENTION

1. Field of the Invention

This invention relates to a squirrel-proof bird feeder and more particularly to a squirrel-proof sunflower seed bird feeder which denies feeding access to squirrels by way of a unique connection system between an inner housing member and an outer housing member of the bird feeder.

2. Description of the Related Art

Many types of squirrel-proof bird feeders have been previously provided but it is believed that they suffer from certain disadvantages. First, some of the squirrel-proof bird feeders of the prior art are constructed of wood or plastic which may be damaged by an aggressive squirrel. Secondly, it is believed that the mechanisms of the prior art for closing feed ports of a bird feeder if a squirrel moves onto the feeder are not reliable and are difficult to maintain. Third, it is believed that the squirrel-proof feeders of the prior art do not have adequate feed level control devices associated therewith.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A squirrel-proof sunflower seed bird feeder is described with the feeder including an outer housing member having an inner housing member positioned therein. The outer housing member is vertically movable with respect to the inner housing member when a squirrel moves onto the outer housing member.

The outer housing member of the feeder is elongated and is tubular and has upper and lower ends. The outer housing member has first and second alternating bands of openings or perforations formed therein with the openings in the first bands being smaller than the openings in the second bands thereof. The tubular inner housing member has upper and lower ends and has first and second alternating bands having openings or perforations formed therein with the openings in the first bands thereof being smaller than the openings in the second bands thereof. The outer housing member is vertically movable between first and second positions with respect to the inner housing member. The first and second bands of openings in the outer housing member register with the first and second bands of openings in the inner housing member respectively when the outer housing member is in its first position. The second bands of openings in the outer housing member are positioned below the second bands of openings in the inner housing member when the outer housing member is in its second position.

The inner housing member has a feed level control device positioned therein adjacent each of the second bands of openings which maintains a certain amount of feed at that level in the inner housing member even though the main supply of feed has dropped below the feed level control device. A spring means connects the inner and outer housing members to yieldably maintain the outer housing member in its first position but which will permit the outer housing member to move to its second position if a squirrel should move onto the outer housing member.

In the preferred embodiment, the openings in the second bands of openings of the outer housing member are larger than the openings in the second bands of openings in the inner housing member and the openings in the first band of openings in the outer housing member are larger than the openings in the first bands of openings in the inner housing member.

In the preferred embodiment, the feed level control devices are inverted truncated funnels. In the preferred embodiment, the outer and inner housing members are comprised of a metal mesh material. In the preferred embodiment, a pair of springs interconnect the outer and inner housing members to yieldably maintain the outer housing member in its first position. In the preferred embodiment, the springs are positioned at the outer side of the inner housing member. In the preferred embodiment, the outer housing member has a pair of vertically disposed slots formed therein at the upper end thereof which receive the springs therein and with the inner housing member having a pair of vertically disposed grooves or recesses formed therein which partially receive the springs therein. In the preferred embodiment, the springs are covered by shields to prevent squirrels from damaging the springs. In the preferred embodiment, each of the springs have upper and lower ends with the upper ends of the springs being secured to the inner housing member and the lower ends of the springs being secured to the outer housing member. Thus, if a squirrel moves onto the outer housing member, the registering feed openings between the outer housing member and the inner housing member are no longer in a registering position which denies access of the squirrels to the feed in the inner housing member.

It is therefore a principal object of the invention to provide an improved squirrel-proof sunflower seed bird feeder.

A further object of the invention is to provide a unique squirrel-proof sunflower seed bird feeder including inner and outer housing members with the outer housing member being movable downwardly with, respect to the inner housing member should a squirrel move onto the outer housing member.

Yet another object of the invention is to provide a bird feeder of the type described including inner and outer housing members with each of the inner and outer housing members having alternating first and second bands of openings formed therein.

Another object of the invention is to provide a unique bird feeder of the type described which includes feed level control devices positioned in the inner housing of the bird feeder.

Yet another object of the invention is to provide a bird feeder of the type described which resists damage thereto by aggressive squirrels.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
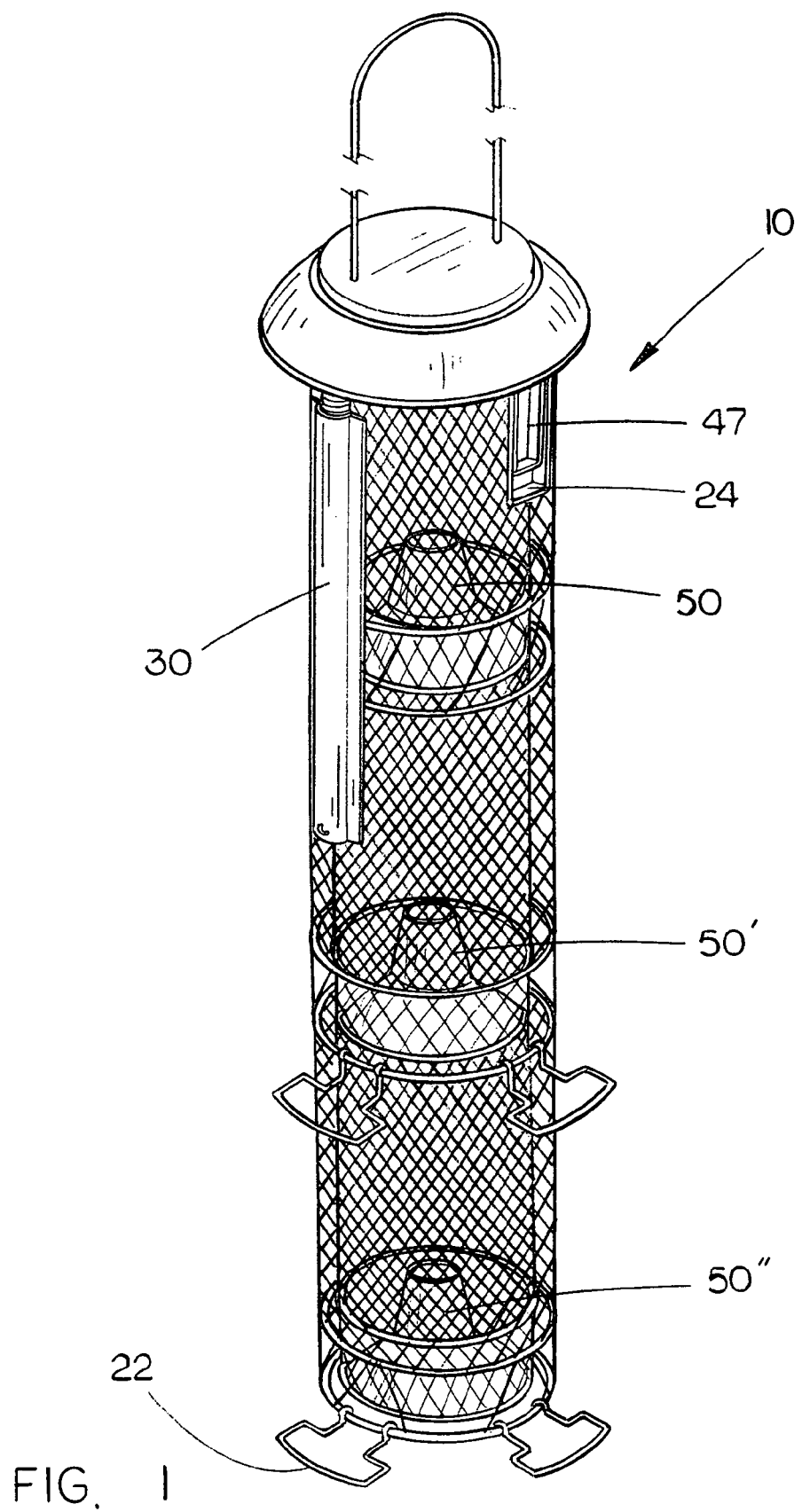
FIG. 1 is a perspective view of the bird feeder of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to the squirrel-proof sunflower seed bird feeder of this invention. Feeder 10 includes an outer housing member 12 comprised of a metal mesh material and which has an upper end 14 and a lower end 16. Outer housing member is comprised of alternating first and second bands or segments 18, 20, 18', 20', 18" and 20". The bands 18, 18' and 18" have perforations or openings formed therein which are of the same size. The bands 20, 20' and 20" have perforations or openings formed therein which have the same size. The perforations or openings in bands 20, 20' and 20" are larger than the size of the perforations or openings in bands 18, 18' and 18". Bands 20, 20' and 20" define feed openings. Perches 22 are preferably mounted on housing member 12 as seen in FIG. 2.

Figure 2:
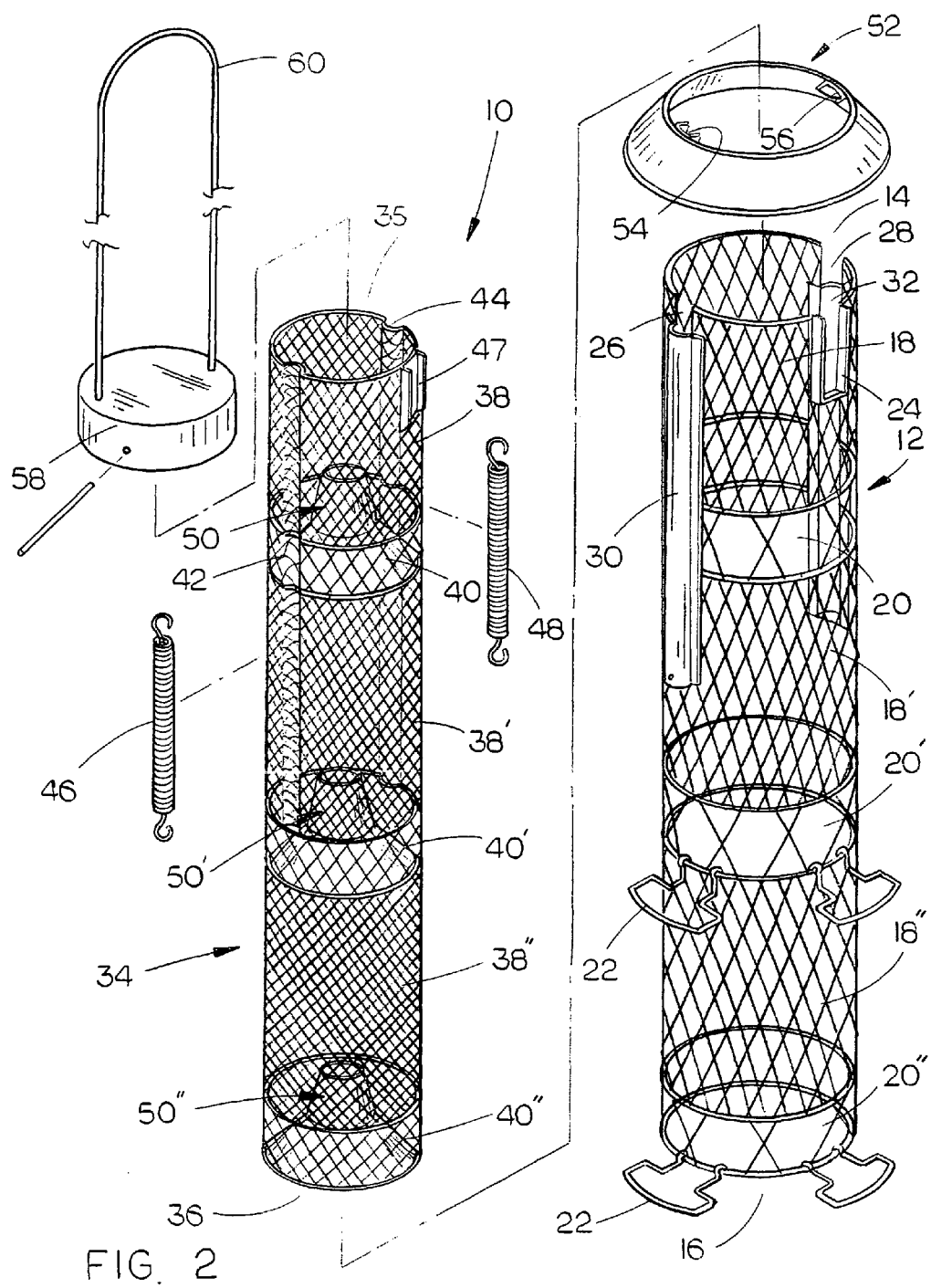
FIG. 2 is an exploded perspective view of the bird feeder of this invention.

Housing member 12 is provided with a guide slot 24 formed therein at its upper end as seen in FIG. 2. Housing member 12 has a pair of vertically disposed slots 26 and 28 formed therein which extend downwardly from the upper end thereof. The numerals 30 and 32 refer to elongated and arcuate shields which are secured to the outer side of housing member 12 outwardly of slots 26 and 28 respectively.

Feeder 10 also includes an inner housing member 34 having an upper end 35 and a lower end 36. Inner housing member 34 is comprised of a metal mesh material and has alternating first and second bands or segments 38, 40, 38', 40', 38" and 40". The bands 38, 38' and 38" have perforations or openings formed therein which are the same size. The bands 40, 40' and 40" have perforations or openings formed therein which have the same size. The perforations or openings in bands 40, 40' and 40" are larger than the size of the perforations or openings in bands 38, 38' and 38". Bands 40, 40' and 40" define feed openings.

Inner housing member 34 has a pair of elongated recesses 42 and 44 formed therein which register with slots 26 and 28 of outer housing member 12. Springs 46 and 48 are adapted to be partially positioned in the recesses 42 and 44 respectively and to be partially received in the slots 26 and 28 respectively as will be described hereinafter. The numerals 50, 50' and 50" refer to feed level control devices such as disclosed in my U.S. Pat. No. 7,198,004. The devices 50, 50' and 50" have a shape of an inverted, truncated funnel and are associated with the bands 40, 40' and 40" respectively which maintain a certain amount of feed at that level in the inner housing member 34 even though the main supply of feed has dropped below that feed level control device.

Inner housing member 34 is inserted downwardly into outer housing member 12 until the lower end 36 of inner housing member 34 rests upon the lower end of outer housing member 12. At that position, bands 38, 40, 38', 40', 38" and 40" of inner housing member 34 will register with bands 18, 20, 18', 20', 18" and 20" of outer housing member 12 respectively. During the insertion of housing member 34 into housing member 12, the guide 47 will be received by the guide slot 24. The lower ends of springs 46 and 48 are connected to the outer housing member 12 and the upper ends of springs 46 and 48 are connected to the upper end of housing member 34 with the springs 46 and 48 being partially received in the recesses 42 and 44 respectively. Shields 30 and 32 are then secured to outer housing member 12 to shield the springs from damage from squirrels.

A rain shield or roof 52 is then positioned on the upper end of housing member 12 with the channels 54 and 56 of roof 52 being received by the upper ends of the slots 26 and 28 respectively. Cover or lid 58 with hanger 60 is then secured to the upper end of housing member.

In normal use, the birds may feed from the sunflower seeds in the inner housing member 34 by way of the registering feed openings created by bands 20, 40, 20', 40' or 20", 40". If a squirrel should move onto the outer housing member 12, the weight of the squirrel will cause the outer housing member 12 to move downwardly against the yieldable force of springs 46 and 48 so that the bands 20, 20' and 20" no longer register with bands 40, 40' and 40" to prevent the squirrel from gaining access to the feed in the feeder. When the squirrel departs from the feeder, the springs 46 and 48 cause the housing member 12 to return to its normal position so that bands 20, 20' and 20" again register with bands 40, 40' and 40" respectively.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. A squirrel-proof sunflower seed bird feeder, comprising:
a vertically disposed tubular outer housing member having upper and lower ends and inside and outside surfaces;
said outer housing member having first and second alternating bands of openings formed therein with the openings in said first bands being smaller than the openings in said second bands;
a vertically disposed tubular inner housing member having upper and lower ends and inner and outer surfaces;
said inner housing adapted to contain bird feed comprised of sunflower seeds;
said inner housing having first and second alternating bands of openings formed therein with the openings in said first bands thereof being smaller than the openings in said second bands thereof;
said inner housing member being positioned in said outer housing;
said outer housing member being vertically movable between first and second positions with respect to said inner housing member;
said first and second bands of openings in said outer housing member registering with said first and second bands of openings in said inner housing member respectively when said outer housing member is in its said first position;
said second bands of openings in said outer housing member being positioned below said second bands of openings in said inner housing member when said outer housing member is in its said second position;
said inner housing member having a feed level control device positioned therein adjacent each of said second bands of openings which maintains a certain amount of feed on the feed level control device in said inner housing member even though the level of feed has dropped below said feed level control device;

said outer housing member having radially spaced-apart first and second vertically disposed elongated slots formed therein which extend downwardly from said upper end thereof;

said inner housing member having radially spaced-apart first and second vertically disposed elongated recesses formed therein which extend downwardly from said upper end thereof;

said first and second recesses in said inner housing member being aligned with and positioned inwardly of said first and second slots of said outer housing member respectively;

a first elongated and vertically disposed spring having upper and lower ends;

a second elongated and vertically disposed spring having upper and lower ends;

said first spring being positioned in said first slot of said outer housing member and said first recess of said inner housing member;

said upper end of said first spring being secured to said inner housing member at said upper end of said first recess thereof;

said lower end of said first spring being secured to said outer housing member at said lower end of said first slot thereof;

said second spring being positioned in said second slot of said outer housing member and said second recess of said inner housing member;

said upper end of said second spring being secured to said inner housing member at said upper end of said second recess thereof;

said lower end of said second spring being connected to said outer housing member at said lower end of said second slot thereof;

said first and second springs yieldably maintaining said outer housing member in said first position while permitting said outer housing member to move to said second position if a squirrel should move onto said outer housing member;

an elongated first cover secured to said outer housing member which encloses said first slot of said outer housing member and said first spring; and an elongated second cover secured to said outer housing member which encloses said second slot of said outer housing member and said second spring.

2. The feeder of claim 1 wherein said outer housing member and said inner housing member include cooperating elements which maintain said first and second slots and said first and second recesses in alignment.

3. The feeder of claim 1 wherein the openings in said second bands of openings of said outer housing member are larger than the openings in said second bands of openings in said inner housing member.

4. The feeder of claim 1 wherein the openings in said first bands of openings in said outer housing member are larger than the openings in said first bands of openings in said inner housing member.

* * * * *